Aug. 16, 1955  R. CLADE  2,715,412
GASKETED VALVE
Filed Nov. 13, 1950
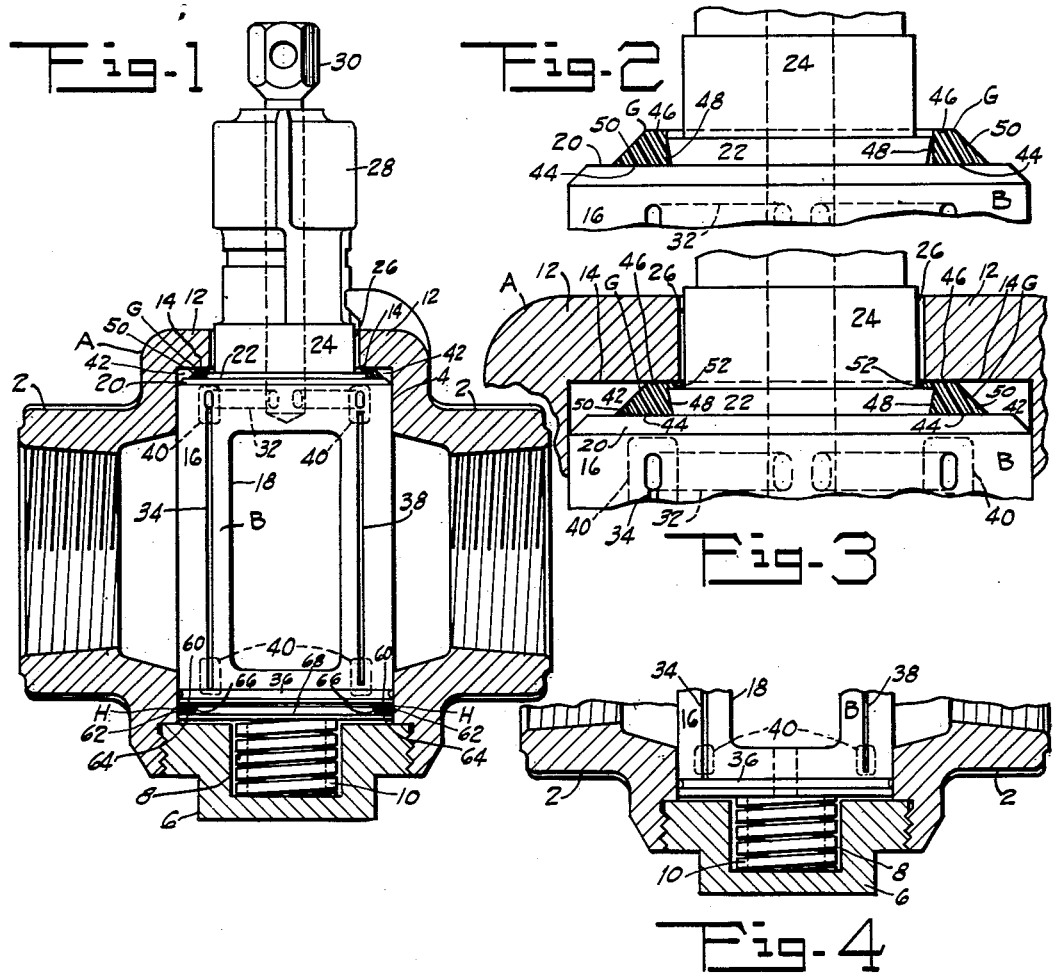
INVENTOR
ROBERT CLADE
BY
*Robert A. Shields*
ATTORNEY United States Patent Office 2,715,412
Patented Aug. 16, 1955

2,715,412

GASKETED VALVE

Robert Clade, Detroit, Mich., assignor, by mesne assignments, to W-K-M Manufacturing Company, Inc., a corporation of Delaware Application November 13, 1950, Serial No. 195,315

7 Claims. (Cl. 137—246.17)

This invention relates to valves in general but in particular to valves having sealing gaskets located adjacent the plug ends.

Valves for years have been constructed with various packing arrangements to prevent leakage but such packing arrangements have required frequent renewal and adjustment to prevent leakage of material. Certain valves, particularly of the lubricated type, have been constructed with metal to metal contact with the sealing accomplished by a lubricant forced onto the surface between the moving parts. Such an arrangement is very satisfactory except when some foreign material is entrained in the lubricant and holds the parts out of contact. It is an object, therefore, of the present invention to provide a valve of the lubricated type in which internally located gaskets are provided which positively prevent leakage at either the neck or base plug zones of the valve.

A further object of the invention is the provision of a lubricated valve having a neck or stem gasket which moves with the plug to permit a safety relief for the lubricant while preventing loss of lading from the valve.

A still further object of the invention is the provision of a lubricated valve having internally located gaskets positioned adjacent the stem and base of the plug and held in position by a single resilient means.

A yet further object of the invention is the provision of a lubricated valve having a pair of spaced gaskets held in position by a single pressure equalizer plate.

These and other objects of the invention will be apparent to persons skilled in the art from a study of the following description and accompanying drawings, in which:

Fig. 1 is a sectional view through the improved lubricated type of valve;

Fig. 2 is an enlarged view of a portion of the plug prior to insertion in the body;

Fig. 3 is an enlarged sectional view of the upper portion of the plug and body of Fig. 1;

Fig. 4 is a fragmentary sectional view of the lower portion of the valve of Fig. 1 but showing a slight modification thereof.

Referring now to the drawings in detail it will be seen that the valve is constructed of two main parts, namely, the body A and the plug B. The body A is formed with attaching portions 2 by means of which it can be connected to piping for the transmission and control of the flow of matter through the valve. The attaching portions 2 are joined by a passageway intersected substantially at right angles by a bore having a finished surface 4. This bore is open at one end and adapted to be closed by a base plug 6 preferably threaded into the body as shown and provided with a cavity 8 for reception of a resilient device such as spring 10. The upper end of the bore is partially closed by overhanging shoulders 12 having their interior surface finished to provide a seat 14.

The plug B is preferably formed with a cylindrical portion 16 adapted to closely fit within the finished bore of the body and this cylindrical portion is provided with a passageway 18 adapted to be disposed either in alignment with or transversely of the body passageway to thereby control flow of matter through the valve. A portion of the upper end of the plug is finished to provide a flat seating surface 20 extending inwardly toward the center of the plug where it merges into an upstanding shoulder 22 which may have its outer surface either vertical, that is, parallel to the axis of the plug, or slightly under cut as clearly shown in Figs. 2 and 3. The upper surface of the step shoulder 22 extends inwardly and merges into an enlarged circular stem portion 24 extending upwardly through the opening 26 formed in the upper end wall of the body. The stem extends upwardly beyond the circular portion to provide a square or other shaped operating portion 28 adapted to receive a wrench gear or other means for turning the valve plug in the body. The plug as shown in Figs. 1 to 4 inclusive is preferably of the lubricated type and has lubricant fed under pressure exerted by ram 30 downwardly through the stem and outwardly through passages 32 to diametrically opposed relatively long grooves 34 which are connected at their lower ends to a circumferential groove 36. Diametrically opposed short grooves 38 are disposed on opposite sides of passageway 18 from grooves 34 and are not in direct connection with passages 32 or circumferential groove 36. However, in full open or closed position of the valve lubricant may be fed to these short grooves by means of dwarf grooves or cavities 40 formed in the body as clearly shown. Lubricant fed in under pressure by screw 30 will fully fill the grooves forming the lubricant system of the valve and will also fill the cavity 42 formed between the overhanging shoulder 12 and the upper end of the plug.

Tests show that substantially half of the turning effort of the plug in the body is due to the end load, that is, by the pressure of material in the passage attempting to blow the plug out of the opening 26. In order to cut down this end load friction and at the same time provide an effective seal, a neck or head seat gasket G has been provided. This gasket as clearly shown, particularly in Figs. 2 and 3, is formed with a lower surface 44 adapted to rest on the finished surface 20 of the plug and it is also formed with an upper surface 46 adapted to bear against the finished surface 14 of the overhanging shoulders 12. The upper and lower surfaces are separated a sufficient distance, that is, the thickness of the gasket is so chosen that the upper surface 46 is disposed slightly above the upper edge of shoulder 22. The inner wall 48 preferably extends vertical and has a close fit with the shoulder or stepped portion 22. It has been discovered by repeated tests that the outer surface 50 must be inclined as shown and the degree of inclination, that is, the angle between surfaces 50 and 44 should be in the range between thirty and sixty degrees with forty-five giving the most favorable results. This gasket is preferably made of polytetrafluoroethylene which is a chemically inert material capable of withstanding reasonably high temperatures and having a naturally oily feel and good antifriction properties. This material, however, being a plastic flows under pressure and must be subjected to a substantially constant pressure in order to properly seal. In the normal assembled position the gasket will have the shape as shown in Fig. 2, but after assembly and application of pressure the gasket will flow locking itself to the slightly overhanging shoulder 22 and extruding a small lip 52 into the space between the upper surface of shoulder 22 and the finished surface 14 of the overhanging body shoulders. As previously stated, it is not necessary for the shoulder 22 to be under cut or overhang as shown although such a formation will assist in assuring that the gasket G moves with the plug during the unloading operation of the valve later to be described. The vertical component of the lubricant under pressure in cavity 42 acting on the sloping wall 50 will effectively hold the gasket G in contact with the plug during downward or unloading motion of the plug. High pressure in the body will, of course, give high end loading tending to further extrude the gasket material and increase the length of lip 52. However, as this lip tends to increase, the spacing between the upper edge of shoulder 22 and shoulder 12 decreases, and this decreased space coupled with the increased length of tongue 52 will stop further extrusion and prevent the gasket material being forced vertically upward into the clearance space between hole 26 and the round stem portion 24.

In order to prevent any leakage of material through the joint between the body and base plug, a lower gasket H may be used as clearly shown in Fig. 1. This lower gasket has an upper surface 60 adapted to bear upon the lower surface of the plug B and an outer surface or vertical wall 62 adapted to bear upon the finished wall 4 of the transverse bore. The lower surface 64 and inclined inner surface 66 are adapted to bear upon flat and inclined surfaces of a pressure or equalizer plate 68. This plate is spaced from the lower end of the plug and is supported in position by resting upon the upper end of spring 10 previously referred to. Thus it will be seen that the spring 10, which is normally placed under a relatively heavy precompression during assembly of the valve, will constantly urge pressure plate 68 upwardly, thus holding both the lower gasket H and upper gasket G under steady and constant pressure, thus effectively sealing the valve against leakage of material through either the neck or base portions. Constant upward pressure of pressure plate 68 will, due to the beveled inner surface of the gasket H, tend to expand the gasket and hold it in close engagement with the bore 4 of the body.

It is desirable that an axial shift of the plug in the body occur in order that high lubricant pressures can not be built up with possible rupture of the body. For certain material it has been found that the bottom gasket H can be eliminated with the spring 10 bearing directly on the bottom of the plug as clearly shown in Fig. 4, but the axial shift of the plug will be the same whether the pressure plate and lower gasket is used or not. Assuming that lubricant under pressure is forced into the valve under high pressure it will fill the lubricant system comprising the passages 32, grooves 34, 36, 38 and cavity 42. As soon as the system is fully charged with lubricant, pressure tends to build up rapidly in chamber 42 with the result that it overcomes the compression of spring 10 and the pressure of the material tending to blow the plug out of hole 22. As soon as the pressure in chamber 42 has overcome these forces the plug will shift downwardly or axially in the body and lubricant can then flow out over the top surface 46 of gasket G, that is, between this surface and the finished surface 14 of the body and thence out through the clearance between hole 26 and circular stem portion 24. Due to the locking of gasket G to shoulder 22, but more particularly due to the vertical component of the lubricant acting on sloping surface 50, the gasket G must move downwardly with the plug and can not rotate or move upwardly, thus preventing the escape of excess lubricant which is so necessary to prevent rupture of the body and over lubrication of the valve.

While the invention has been described more or less in detail with specific reference to the drawings it will be obvious that various modifications and rearrangements of parts other than those shown and described may be made and all such modifications and rearrangements are contemplated as fall within the scope of the following claims defining my invention.

What is claimed is:

1. In a lubricated valve, a valve body, a valve plug rotatably mounted in the body, overhanging shoulders formed on the body and having an internal seating surface overlapping a portion at least of one end of the plug, a seating surface formed on said one end of the plug, a shoulder projecting outwardly from one of said surfaces toward the other surface in overlapping relation, a gasket closely engaging a side of said shoulder and bearing on said seating surfaces, a lubricant chamber formed by said gasket together with said surfaces and body, means to introduce lubricant under pressure into said lubricant chamber, and means to resiliently force said plug into engagement with said gasket and said gasket into engagement with said internal seating surface of the body, said means yielding upon increase of pressure in said lubricant chamber to permit axial shifting of said plug in said body whereby lubricant may escape past said gasket.

2. The structure of claim 1 characterized in that said shoulder is formed on said plug and said gasket shifts axially with said plug to allow escape of lubricant between said gasket and internal seating surface of the body.

3. The structure of claim 1 characterized in that the side of said gasket forming part of the lubricant chamber is sloped whereby lubricant pressure acting thereon will hold the gasket in engagement with the seating surface from which said shoulder projects during axial shift of the plug.

4. In a lubricated valve, a valve body having a substantially cylindrical bore, a valve plug rotatably mounted in the body bore, a stem formed on the plug and projecting outwardly through the body, an overhanging shoulder formed on the body and surrounding said stem, an internal seating surface formed on said overhanging shoulder and overlapping the end of the plug adjacent said stem, a seating surface formed on said plug end adjacent the stem, an upstanding shoulder projecting upwardly from said plug and between said last named seating surface and stem, a gasket bearing on said seating surfaces and closely engaging the side of said shoulder remote from the stem and of a thickness greater than the height of said shoulder, said seating surfaces, gasket, and body bore defining a lubricant chamber surrounding said stem, means to introduce lubricant under pressure into said lubricant chamber, and means to resiliently force said plug into engagement with said gasket and said gasket into engagement with said internal seating surface of the body, said means yielding upon increase of pressure in said chamber to permit axial shift of the plug in the body whereby lubricant may escape past said gasket.

5. The structure of claim 4 characterized in that the side of said gasket forming one side of the lubricant chamber slopes inwardly and upwardly at an angle sufficiently small as to insure axial shift of the gasket in unison with said plug.

6. The structure of claim 4 characterized in that the side of said gasket forming one side of the lubricant chamber slopes inwardly and upwardly at an angle between thirty and sixty degrees to insure axial shift of the gasket in unison with said plug and to also insure gripping of said shoulder by the inner side of the gasket.

7. The structure of claim 4 characterized in that said means comprises a second gasket bearing on the end of said plug opposite the stem, a pressure plate bearing on said second gasket and forcing it against the plug and body bore, and a spring resiliently acting on the center of said pressure plate.

References Cited in the file of this patent

UNITED STATES PATENTS

| Number | Name | Date |
|---|---|---|
| 461,084 | Pratt | Oct. 13, 1891 |
| 1,197,863 | Schreiber | Sept. 12, 1916 |
| 1,879,481 | Putnam | Sept. 27, 1932 |
| 1,964,782 | Bard | July 3, 1934 |
| 1,992,738 | Carpenter | Feb. 26, 1935 |
| 2,043,863 | Nordstrom | June 6, 1936 |
| 2,263,454 | Clade | Nov. 18, 1941 |
| 2,393,967 | Brubaker | Feb. 5, 1946 |
| 2,487,436 | Goehring | Nov. 8, 1949 |